(12) United States Patent
Khosrova et al.

(10) Patent No.: US 8,732,811 B2
(45) Date of Patent: May 20, 2014

(54) SYSTEMS AND METHODS FOR IMPLEMENTING SECURITY SERVICES

(75) Inventors: Eliza Khosrova, Los Angeles, CA (US); Harishankar Karantothu, Mission Viejo, CA (US); Craig Mazzagatte, Aliso Viejo, CA (US); Wei-Jhy Chern, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 45 days.

(21) Appl. No.: 13/420,462

(22) Filed: Mar. 14, 2012

(65) Prior Publication Data

US 2012/0254969 A1    Oct. 4, 2012

Related U.S. Application Data

(63) Continuation-in-part of application No. 13/073,882, filed on Mar. 28, 2011.

(51) Int. Cl.
  *G06F 21/00* (2013.01)
  *G06F 21/41* (2013.01)
  *H04L 29/06* (2006.01)
  *G06F 9/445* (2006.01)
  *G06F 9/455* (2006.01)

(52) U.S. Cl.
  CPC .............. *G06F 21/41* (2013.01); *H04L 63/08* (2013.01); *H04L 63/105* (2013.01); *G06F 9/44521* (2013.01); *G06F 9/45504* (2013.01)
  USPC .......................................................... 726/8

(58) Field of Classification Search
  CPC ..... G06F 21/41; G06F 9/44521; H04L 63/08; H04L 63/105
  USPC .......................................................... 726/8
  See application file for complete search history.

(56) References Cited

U.S. PATENT DOCUMENTS

| 7,516,331 | B2 | 4/2009 | Jin et al. |
| 2005/0114683 | A1* | 5/2005 | Jin et al. ............... 713/187 |
| 2009/0125989 | A1* | 5/2009 | Flaherty et al. .......... 726/5 |
| 2009/0210925 | A1 | 8/2009 | Ogata |

FOREIGN PATENT DOCUMENTS

| JP | 2002-287990 A | | 10/2002 |
| JP | 2009-199234 A | | 9/2009 |
| WO | WO 02/065228 | * | 8/2002 |

* cited by examiner

*Primary Examiner* — Kambiz Zand
*Assistant Examiner* — Aubrey Wyszynski
(74) *Attorney, Agent, or Firm* — Canon U.S.A., Inc. IP Division

(57) ABSTRACT

Systems and methods for providing a login context operate a virtual machine, wherein the virtual machine includes an open services platform and an authentication service, wherein the authentication service includes a classloader, and an initial classloader is designated as the classloader of the authentication service, register a login module, receive an authentication request from a first application, and responsive to receiving the authentication request designate a classloader associated with the login module as the classloader of the authentication service, generate a login context of the login module, and provide the login context of the login module to the first application, whereby the first application uses the login context to perform an authentication.

20 Claims, 9 Drawing Sheets

CONFIGURATION TABLE 917

| MODULE | CLASSLOADER | CLASS NAME | CALLBACK HANDLER | CONFIGURATION ENTRY |
|---|---|---|---|---|
| Login Module A | ClassLoader A | mydevice/classA | CALLBACKHANDLER A | APPCONFIGURATIONENTRY |
| Login Module B | ClassLoader B | mydevice/classB | CALLBACKHANDLER B | APPCONFIGURATIONENTRY |
| Login Module Z | ClassLoader Z | newmodule/classZ | CALLBACKHANDLER Z | APPCONFIGURATIONENTRY |
| ... | | | | |

SYSTEMS AND METHODS FOR IMPLEMENTING SECURITY SERVICES

CROSS REFERENCE TO RELATED APPLICATIONS

This application is a continuation-in-part of U.S. application Ser. No. 13/073,882, filed on Mar. 28, 2011, which is hereby incorporated by reference.

BACKGROUND

1. Field of the Disclosure

The present disclosure relates generally to authentication.

2. Description of the Related Art

It is often desirable to make computing resources available to only authorized users, for instance to protect against malicious users and programs and to prevent overutilization of the resources. However, the computing resources should be available to authorized users and programs, and different computing resources may need different levels of security. Making the resources available to different users and programs is made more complicated because the resources may need to be accessed across multiple security domains, different security services may be used to secure the resources, and different software platforms may be used to interface with the security services.

Computing environments provide some standardized tools to help solve these issues. In a Java® environment, the Java Authentication and Authorization Service (JAAS) provides a security framework that enables developers to authenticate users and enforce access controls upon users. JAAS also standardizes interfaces and abstracts underlying authentication and authorization mechanisms. JAAS login modules do the actual authentication and authorization. However, login modules need to be determined before or at the time the virtual machine is started because login modules cannot be added or removed dynamically while the virtual machine is running. For example, OSGi platforms require the login modules provided by JAAS to be in the classpath of JAAS. In the Java Virtual Machine, the classpath includes directories or JAR files where the java compiler/runtime will look for .class files. For example, "example.class" will not be found by the Java Virtual Machine unless the classpath includes the directory or JAR file that includes "example.class". Thus, the login modules must be added to the classpath before the Java Virtual Machine is started, which in turn prevents the dynamic addition and removal of login modules.

SUMMARY

In one embodiment, a method for providing a login context comprises starting a virtual machine, wherein the virtual machine includes an open services platform and an authentication service, wherein the authentication service includes a classloader, and an initial classloader is designated as the classloader of the authentication service, registering a login module, receiving an authentication request from a first application, and responsive to receiving the authentication request designating a classloader associated with the login module as the classloader of the authentication service, generating a login context of the login module, and providing the login context of the login module to the first application, whereby the first application uses the login context to perform an authentication.

In one embodiment, a computing device for creating a login context comprises a computer-readable storage device, and one or more processors configured to cause the computing device to perform operations including operating a virtual machine that includes a security platform, registering a first login module while the virtual machine is operating, assigning a first classloader associated with the first login module as a classloader of the security platform, generating a login context of the first login module, and providing the login context of the first login module to a first client application.

In one embodiment, one or more computer-readable media store instructions that, when executed by one or more computing devices, cause the one or more computing devices to perform operations comprising registering a security service while operating a virtual machine, the virtual machine including a security platform, designating a classloader associated with the security service as a classloader of the security platform, generating a context of the security service responsive to receiving a request for a context of the security service from a first application, wherein generating the context of the security service includes invoking the designated security platform classloader, and providing the context of the security service to the first application.

BRIEF DESCRIPTION OF THE DRAWINGS

FIG. 9 illustrates an embodiment of a configuration table.

DETAILED DESCRIPTION

Though the following description includes certain explanatory embodiments, the scope of the claims is not limited to the explanatory embodiments. Additionally, the explanatory embodiments may include several novel features, and a particular feature may not be essential to practice the systems and methods described herein.

Figure 1:
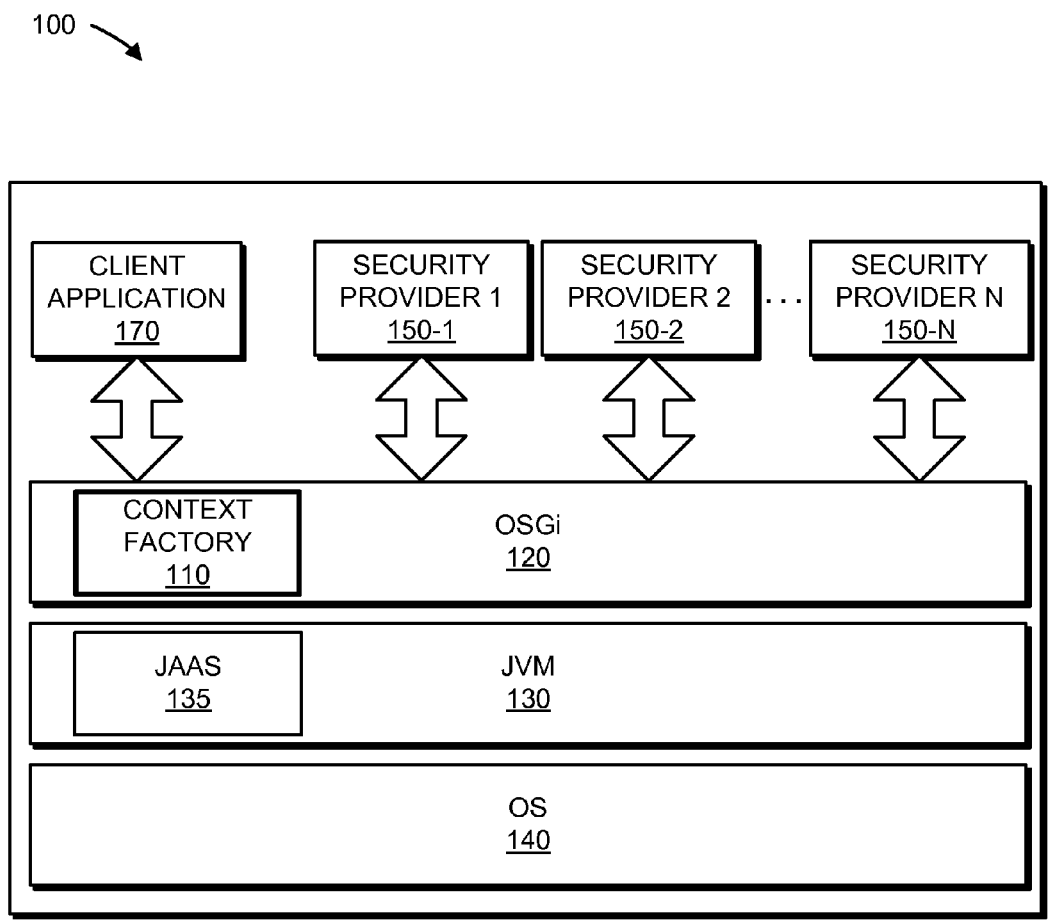
FIG. 1 is a block diagram that illustrates an embodiment of a system for implementing security services.

FIG. 1 is a block diagram that illustrates an embodiment of a system 100 for implementing security services. The system 100 permits the dynamic addition, modification, and removal of security services in an operating virtual machine, and the system includes an operating system 140 (also referred to herein as "OS"), a Java Virtual Machine 130 (also referred to herein as "JVM"), a Java Authentication and Authorization Service 135 (also referred to herein as "JAAS"), an Open Services Gateway initiative platform 120 (also referred to herein as "OSGi"), and a context factory 110. The system 100 also includes a client application 170 and security providers 1 through N 150-1 to 150-N, where N represents any number of security providers. The OS 140 acts as an intermediary between applications and hardware, manages the sharing of resources of a computing device, provides an interface to access those resources, and provides services for other applications. The JVM 130 is a platform-independent environment that converts code (e.g., JAVA bytecode) into machine language for execution. JAAS 135 implements authentication and authorization services and enforces access controls on applications and users. JAAS 135 allows different login modules to be configured into the system, and the different modules can be configured and accessed by applications through the JAAS Application Programming Interface ("API").

The OSGi platform 120 provides a module system and service platform for JAVA and an execution environment that can install, start, stop, update, and uninstall applications and components (also collectively referred to herein as "bundles") without requiring a reboot of the JVM 130. Bundles can make services available to other bundles. A bundle's services are added to a services registry so that other bundles can detect and use them, and the removal of a service from the registry can be used to detect the removal of the service.

The system 100 also includes security providers that make security services available to other applications, modules, bundles, components, etc. FIG. 1 illustrates security providers 1-N (150-1, 150-2 . . . 150-N, also referred to herein as "security providers 150") where N represents any positive integer such that the system is capable of operating with the total number of security providers. The security providers 150 (also illustrated in FIG. 8) may be implemented in bundles and make their services available as OSGi services (including adding the services to the OSGi services registry). The security providers 150 may include login modules and/or provide services that include JAAS authentication and authorization services. The client application 170 may also be a bundle, and the client application 170 may request one or more services (e.g., authentication, authorization) from the security providers 150.

The system 100 also includes a context factory 110 in the OSGi platform 120. The context factory 110 facilitates the access of the security services by the client application 170. When a security provider 150 is loaded onto the OSGi platform and started, the security provider 150 registers itself (e.g., with the context factory 110, with the custom configuration unit 215 (shown in FIG. 2)), including registering any service(s) provided by the security provider 150 and registering a classloader for the service provider and/or service(s). A classloader loads classes (e.g., Java Classes) into a virtual machine (e.g., the JVM). The class loader locates libraries, reads the contents of the libraries, and loads the classes contained within the libraries. The loading may be done "on demand," (i.e., dynamically), and thus the loading may not be performed until the class is actually used by the JVM.

The context factory 110 receives requests for the security service(s) from the client application 170 and returns an interface (e.g., a login context) of the security services to the client application 170. A login context is an object that provides an interface to a security service, stores post-authentication user credential information, and/or lists privileges and permissions. A login context includes a "login" method that invokes a method from a security provider (e.g., from a login module). Also, a login context may be instantiated by JAAS and may comply with the JAAS API. By using the interface (e.g., login context, for example a LoginContext), the client application 170 may then interact with the security service(s) and the security provider 150 without the involvement of the context factory 110 (e.g., without the context factory 110 acting as a proxy). Thus, the client application 170 can use the normal API of JAAS 135 to communicate with the security service(s), which simplifies the design of the client application and/or the use of the security service(s).

Figure 2:
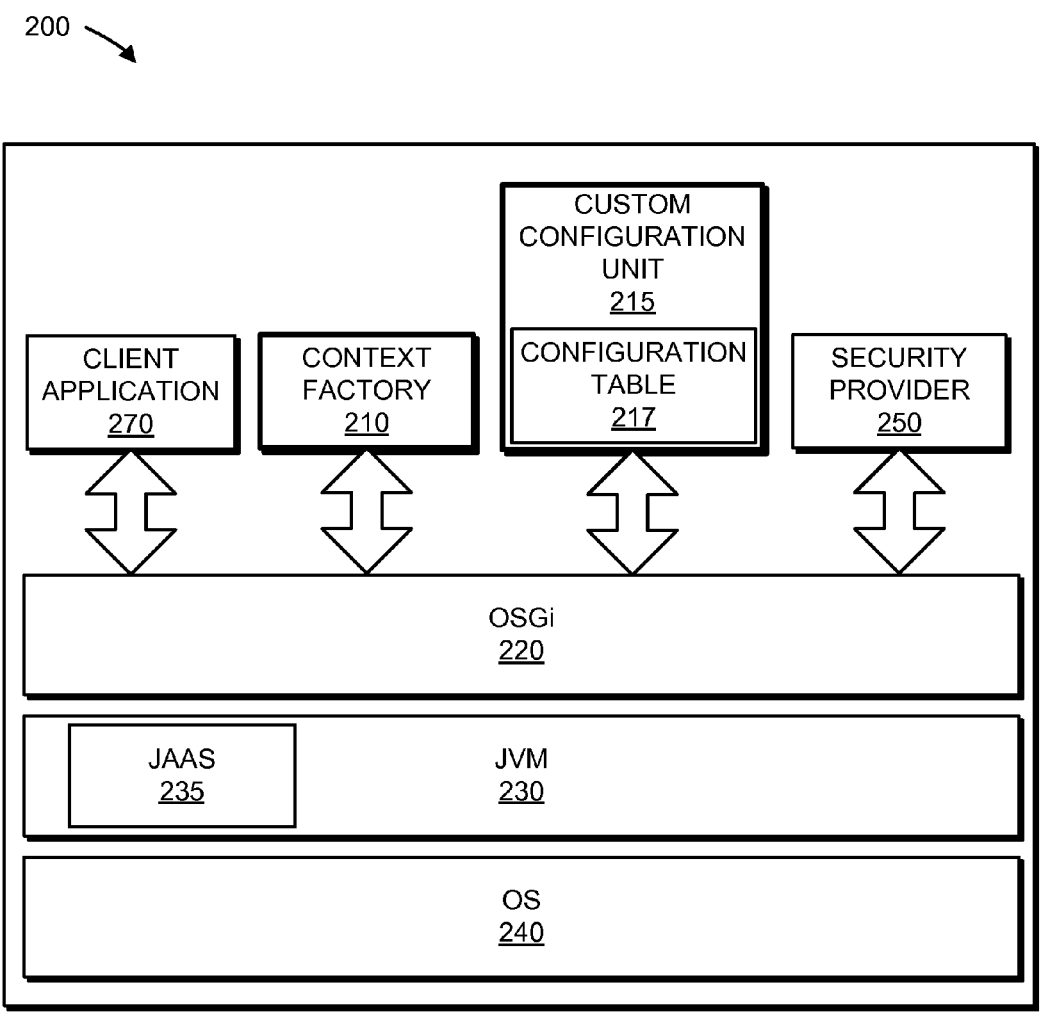
FIG. 2 is a block diagram that illustrates an embodiment of a system for implementing security services.

FIG. 2 is a block diagram that illustrates an embodiment of a system 200 for implementing security services. The system 200 includes an OS 240, a JVM 230, JAAS 235, an OSGi platform 220, a client application 270, and a security provider 250. Additionally, the system includes a context factory 210 and a custom configuration unit 215. The custom configuration unit 215 registers the services and classloader of the security provider 250. The custom configuration unit 215 includes a configuration table 217 that stores data about the security provider 250, including the configuration name, the login module class name, and/or the login module classloader. The data about the security provider 250 may be stored in a respective configuration entry in the configuration table 217. Additionally, in this embodiment, the context factory 210 is a bundle that makes its functionality available to other members of the system as one or more services, and the context factory 210 adds its services to the OSGi framework. Furthermore, the custom configuration unit 215 is a bundle and may also make its functionality available as one or more services, though in other embodiments the custom configuration unit 215 may not be a bundle (e.g., may be part of the OSGi platform 220). Thus, the system 200 allows the dynamic removal, modification, and addition of the context factory 210 and the custom configuration unit 215 while the JVM is running, as well as the dynamic addition and removal of security providers and client applications.

Figure 3:
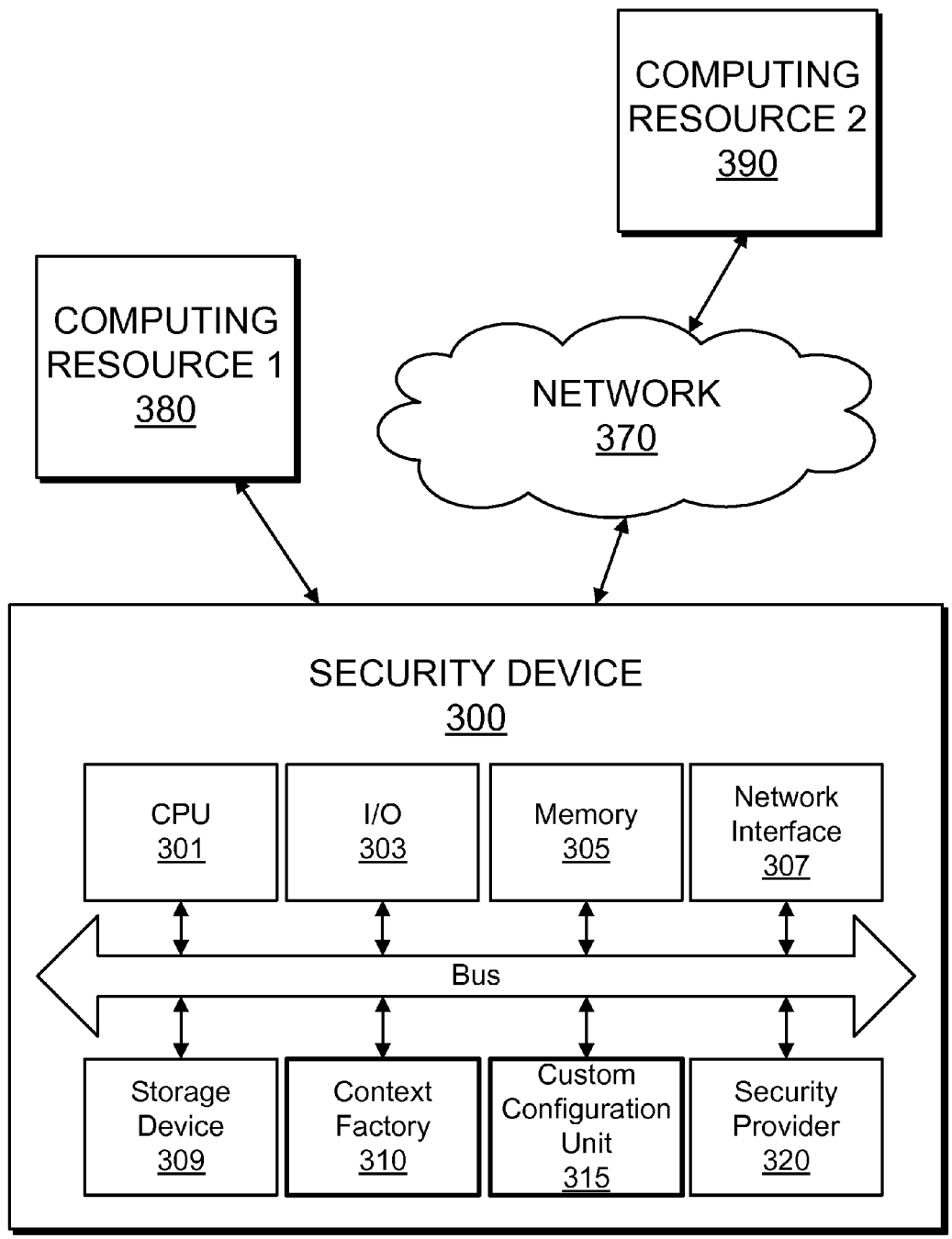
FIG. 3 is a block diagram that illustrates an embodiment of a security device.

FIG. 3 is a block diagram that illustrates an embodiment of a security device 300. The security device 300 communicates with computing resource 1 380 without a network and with computing resource 2 390 via a network 370. The network 370 may include any combination of networks, including the Internet, WANs, and LANs and any combination of wired or wireless networks. Additionally, the security device 300 communicates with computing resource 1 380 via wired or wireless means, including, for example, USB, Ethernet, serial port, Firewire, Bluetooth, and WiFi.

The security device 300 includes one or more processors 301 (also referred to herein as "CPU 301"), which may be a conventional or customized microprocessor(s). The CPU 301 is configured to read and execute computer readable instructions, and the CPU 301 may command/and or control other components of the security device 300. The security device 300 also includes I/O interfaces 303, which provide communication interfaces to other devices, including a keyboard, a display device, a mouse, a printing device, a touch screen, a light pen, an optical storage device, a scanner, a microphone, a camera, etc. The security device 300 also includes a memory 305, which may be volatile or non-volatile, such as ROM, RAM, and flash memory. The security device 300 further includes a network interface 307 that allows the security device 300 to communicate with the network 370. The storage device 309 stores data or modules and may include, for example, a hard drive, an optical storage device, a diskette, and/or a solid state drive. The components of the security device 300 are connected via a bus. The security device 300 includes an operating system, which manages the hardware, the processes, the interrupts, the memory, and/or the file system of the security device 300.

The security device 300 also includes a context factory 310, a custom configuration unit 315, and a security provider 320. The context factory 310, the custom configuration unit 320, and the security provider 320 may be implemented in computer-executable instructions. Computer-executable instructions may be executed by the security device 300 to cause the security device 300 to perform certain operations, including the methods described herein, though for purposes of description a member of the security device 300 may be described as performing the operations. Computer-executable instructions may include logic and may be implemented in software, firmware, and/or hardware. In other embodiments, the context factory 310 and the custom configuration unit 315 may be combined into a single member or further divided into more members. The security device 300 may control access to computing resource 1 380 and computing resource 2 390, and may require client applications to perform authentication and/or authorization operations with the security provider 320 before accessing computing resource 1 380 and computing resource 2 390.

Figure 4:
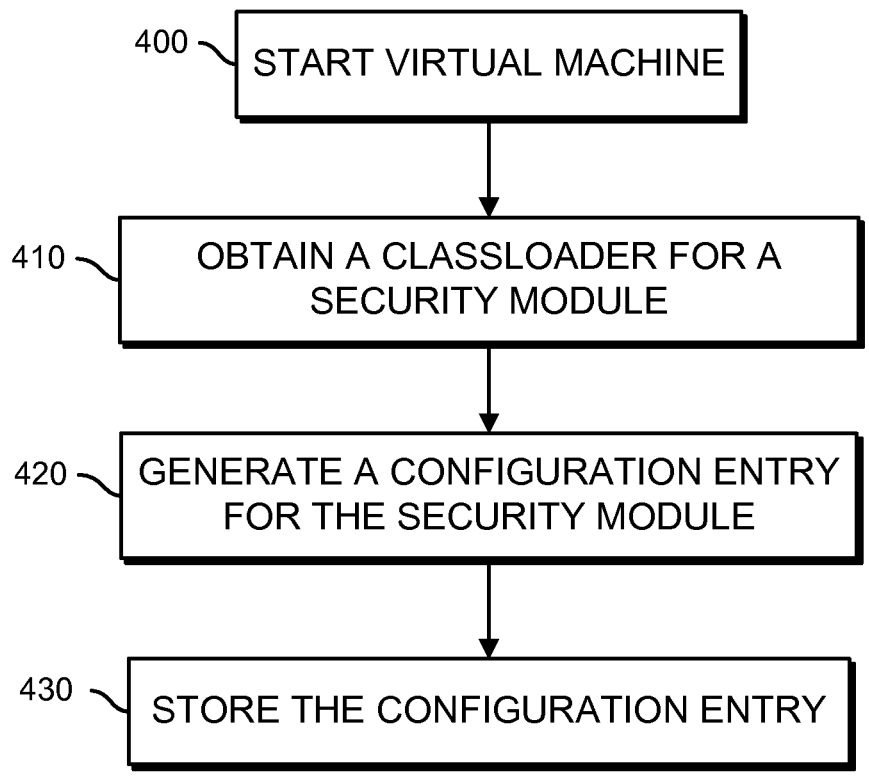
FIG. 4 is a flowchart that illustrates an embodiment of a method for adding security services.

FIG. 4 is a flowchart that illustrates an embodiment of a method for adding security services. Other embodiments of this method and the other methods described herein may omit blocks, may add blocks, may change the order of the blocks, may combine blocks, and/or may divide blocks into separate blocks. Additionally, the components of the systems and devices shown in FIGS. 1-3 (e.g., the context factory 110, the custom configuration unit 215) may implement the method shown in FIG. 4 and the other methods described herein.

Beginning in block 400, a virtual machine is started, such as a JAVA virtual machine. Next, in block 410, a classloader for a security module is obtained. For example, a security module that includes an associated classloader may be installed as part of a bundle on a virtual machine that includes an OSGi platform, and the security module may provide the classloader (as well as login module name(s), class path, etc.) to a custom configuration unit as a parameter passed in a method call. Moving to block 420, a configuration entry is generated for the security module. The configuration entry indicates the classloader and associates the classloader with the security module. Finally, in block 430, the configuration entry is stored, for example in a configuration table in memory.

Figure 5:
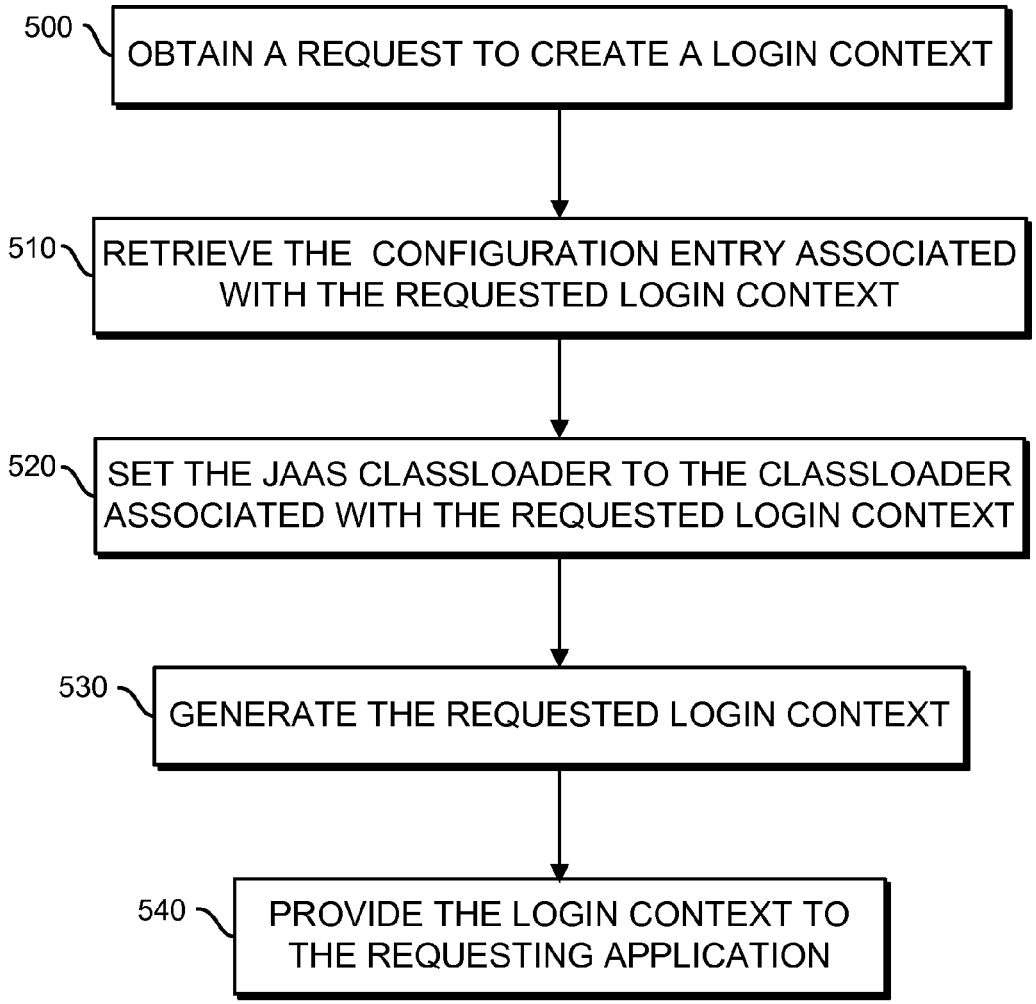
FIG. 5 is a flowchart that illustrates an embodiment of a method for generating a login context.

FIG. 5 is a flowchart that illustrates an embodiment of a method for generating a login context. Beginning in block 500, a request to create a login context is obtained. The request may include, for example, a method call from a client application, bundle, module, component, etc., such as a Multifunction Embedded Application Platform (MEAP) application, and the request may indicate a desired login context or login module. In block 510, the configuration entry associated with the requested login context is retrieved, for example from a configuration table. Next, in block 520, the JAAS classloader is set to the classloader associated with the requested login context, and in block 530 the requested login context is generated. Finally, in block 540, the login context is provided to the requesting application, bundle, module, component, etc.

Figure 6:
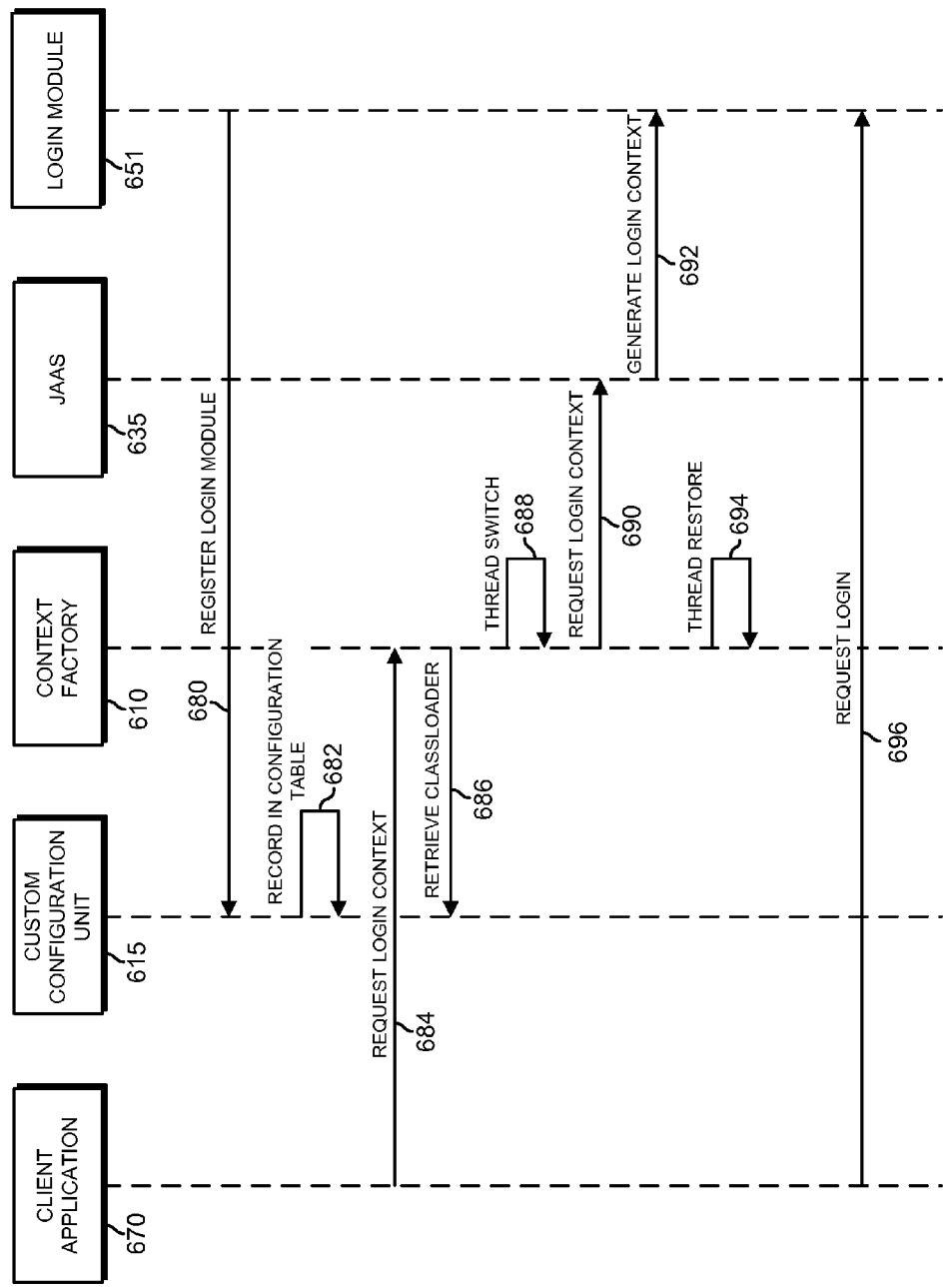
FIG. 6 is a flowchart illustrates an embodiment of a method for generating a login context.

FIG. 6 is a flowchart that illustrates an embodiment of a method for generating a login context. In stage 680, a login module 651 is registered with a custom configuration unit 615. Depending on the embodiment, the login module 651 may register itself with the custom configuration unit 615 or another application, module, bundle, etc. may register it (e.g., a bundle that includes the login module). In stage 682, the custom configuration unit 615 records the information associated with the login module in a configuration table.

Next, in stage 684, a client application 670 requests a login context from the context factory 610. In stage 686, the context factory 610 retrieves the classloader for the requested login context from the custom configuration unit 615. Proceeding to stage 688, the context factory 610 performs a thread switch and changes the JAAS default classloader to the classloader for the requested login context. A thread is a unit of processing that can be scheduled by an operating system. Next, in stage 690 the context factory 610 requests the login context from JAAS 635. In stage 692, JAAS generates the login context using the classloader (and, in some embodiments, the class name (e.g., a login module's fully qualified class name), for example "com.canon.jaas.LoginModuleA") associated with the login module 651. During the thread switch, the context factory 610 and/or JAAS 635 are blocked from attempting to generate additional login contexts (e.g., a blocking call). Moving to stage 694, the thread is restored, which permits the context factory 610 and/or JAAS 635 to generate additional login contexts, the JAAS classloader may be changed back to the JAAS default classloader, and the generated login context is returned to the client application 670. Finally, in stage 696 the client application 670 requests a login from the login module 651 using the returned login context. Using the returned login context, the client application 670 can communicate with the login module and/or JAAS without the use of a proxy. Thus, the client application 670 may use standard JAAS interfaces to perform JAAS authentication.

Figure 7:
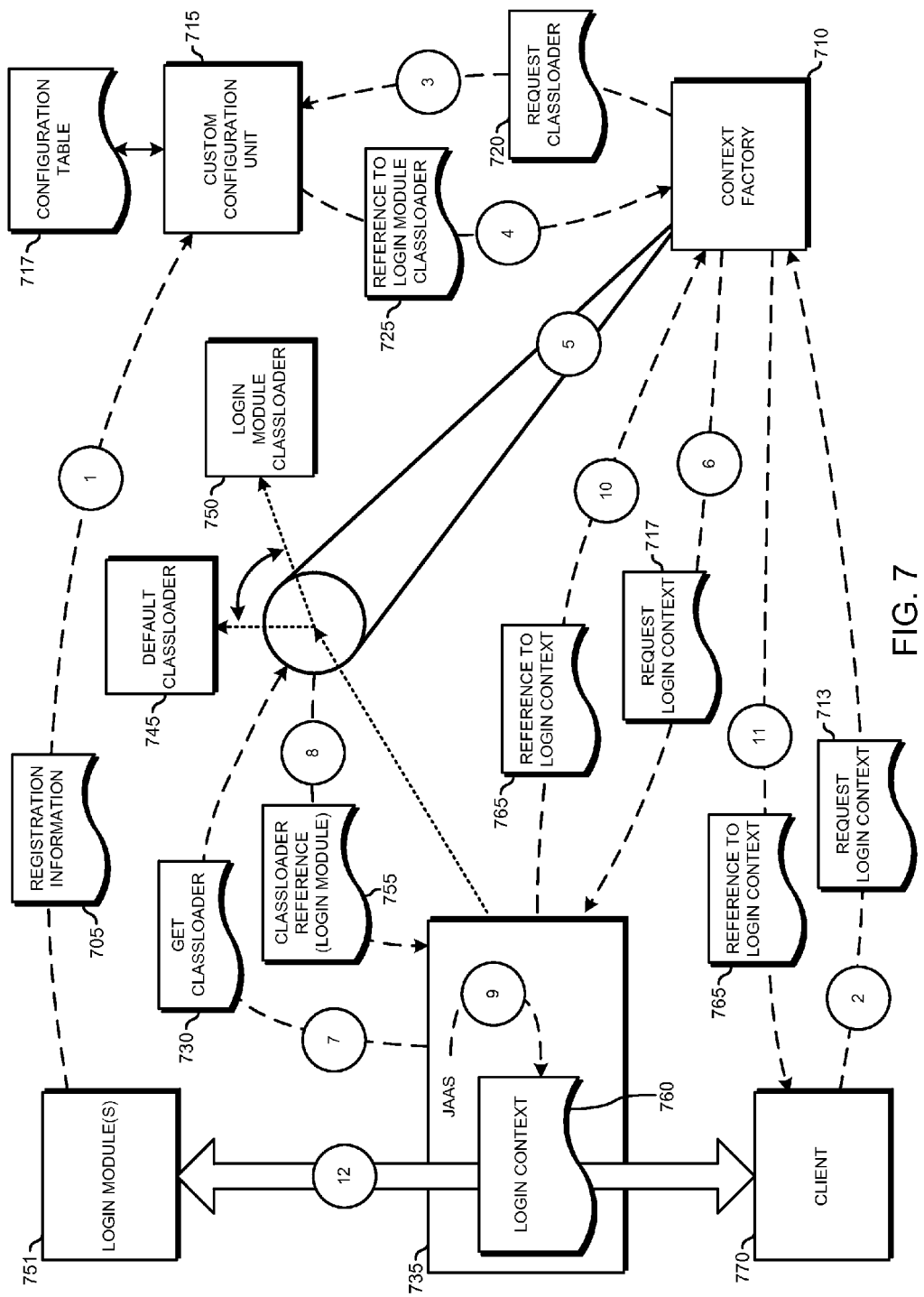
FIG. 7 is a flow diagram that illustrates an embodiment of a system for implementing security services.

FIG. 7 is a flow diagram that illustrates an embodiment of a system for implementing security services. The system includes a client 770, JAAS 735, a context factory 710, a custom configuration unit 715, and login module(s) 751. In stage 1, the login module(s) 751 sends registration information to the custom configuration unit 715. The login module(s) 751 may have been added as part of an OSGi bundle, and the login module(s) 751 may register itself/themselves with the custom configuration unit 715. The registration information 705 may include an identifier of the module(s), the classloader, the class name, the callback handler, and/or the application configuration entry. The custom configuration unit 715 adds the registration information to the custom configuration table 717. For example, the custom configuration unit 715 may store the registration information 705 in an entry associated with the login module(s) 751.

In stage 2, the client 770 sends a request for a login context 713 to the context factory 710. The request for a login context 713 identifies one or more requested login modules for which a login context is sought (e.g., the login module(s) 751). Next, in stage 3, the context factory 710 sends a request for a classloader 720 for the requested login module(s) (in this example, the login module(s) 751). In response to receiving the request for a classloader 720, the custom configuration unit 715 identifies the classloader associated with the requested login module(s) by referring to the configuration table 717 (e.g., maps the requested login module to the associated classloader). The custom configuration unit 715 then sends a reference to the login module classloader 725 to the context factory 710 in stage 4.

In stage 5, the context factory 710 modifies the reference to the login module classloader in JAAS 735. Initially, the login module classloader reference refers to the JAAS default classloader 745, which is determined at runtime of the JVM. Since JAAS 735 will automatically refer to the login module classloader reference to find a classloader to instantiate a login context, and since JAAS 735 is not capable of changing the login module classloader reference while the JVM is running, the context factory 710 changes the login module classloader reference to refer to the login module classloader 750 instead of the default classloader 745. The context factory 710 may also start a blocking thread in stage 5 to block the generation of other login contexts. The blocking may be important because JAAS 735 will use the classloader referred to by the login module classloader reference to generate a login context. Thus, if not blocked, JAAS 735 will use the login module classloader 750 to instantiate other requested login contexts while the login module classloader reference refers to the login module classloader 750. However, the other requested login contexts may be requests for login contexts associated with the default classloader 745. Therefore, it may be desirable to block the generation of other login contexts while the login module classloader reference refers to the login module classloader 750.

Once the login module classloader reference refers to the login module classloader 750, in stage 6 the context factory 710 sends a request for a login context 717 to JAAS 735. In stage 7, JAAS 735 gets the classloader 730 (now the login module classloader 750) referred to by the login module classloader reference. In stage 8, JAAS 735 receives a classloader reference 755 (which refers to the login module classloader 750). Next, in stage 9, JAAS 735 instantiates a login context 760 using the login module classloader 750.

Proceeding to stage 10, a reference to the login context 765 is returned to the context factory 710 by JAAS 735. The context factory 710 may then change the login module classloader reference to refer to the default classloader 745 and end the blocking thread. Next, in stage 11, the reference to the login context 765 is returned to the client 770. Finally, in stage 12, the client 770 uses the login context 760 to communicate with the login module(s) 751. Thus, the client 770 communicates with the login module(s) 751 via the login context 760 in JAAS 735 without a proxy, and the client 770 can use the standard JAAS API to communicate with the login module 751.

Figure 8:
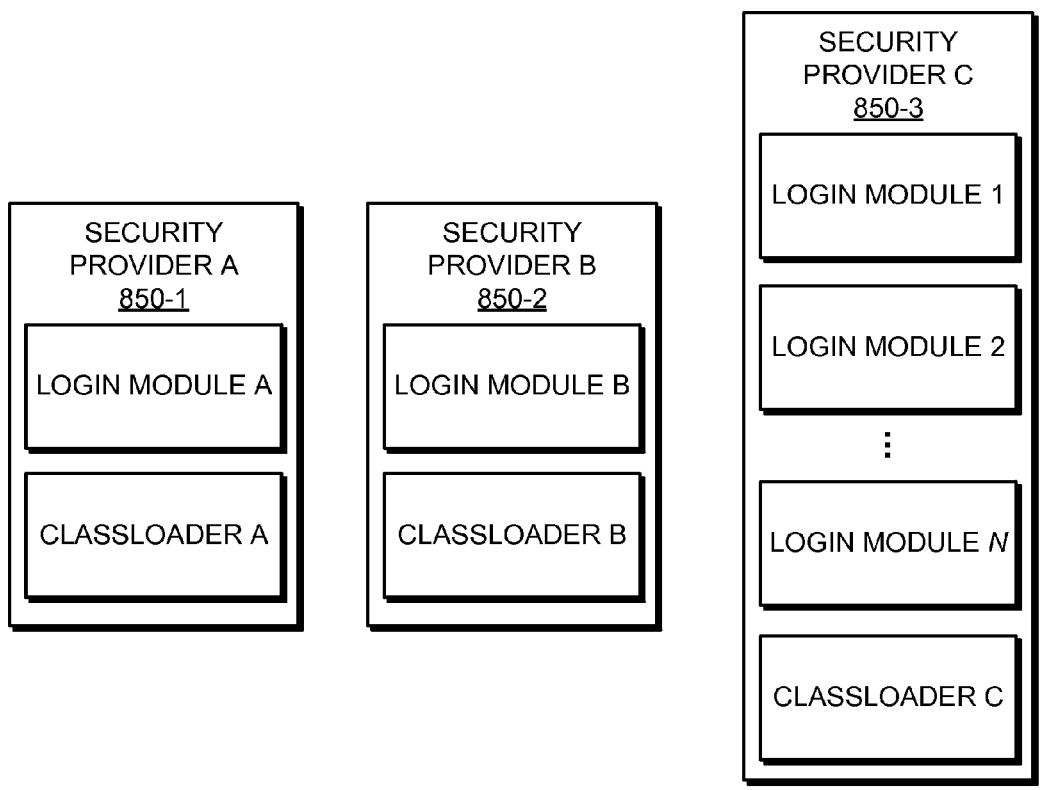
FIG. 8 is a block diagram that illustrates embodiments of security providers.

FIG. 8 is a block diagram that illustrates embodiments of security providers that are implemented as OSGi bundles. The bundle of security provider A 850-1 includes login module A and classloader A. The bundle of security provider B 850-2 includes login module b and classloader B. The bundle of security provider C 850-3 includes multiple login modules, login module 1 to login module N (where N is any applicable number of login modules), and classloader C. The classloader C of security provider C is associated with multiple login modules and can be used to generate a login context that allows a client application to communicate with the associated login modules.

Additionally, a classloader may be able to generate a login context that allows communication with only the login modules of the associated OSGi bundle. For example, classloader A may be used to generate a login context that allows a client application to communicate with login module A, but cannot generate a login context that allows a client application to communicate with login modules from other security providers (e.g., login module B, login module 1). Also, classloader C may be used to generate a login context that allows a client application to communicate with the login modules of security provider C (login module 1, login module 2 . . . login module N), but cannot be used to generate a login context that allows a client application to communicate with the login modules of other security providers (e.g., login module A, login module B).

FIG. 9 illustrates an embodiment of a configuration table 917. The configuration table includes entries (e.g., entries 918A-C) associated with respective login modules. In the embodiment shown, an entry includes a login module, its classloader, its class name, its callback handler, and its configuration entry. Thus, the configuration table 917 may be used to map a login module to any of the information associated with the login module (e.g., classloader, class name).

The above described devices, systems, and methods can be achieved by supplying one or more storage media that store thereon computer-executable instructions for realizing the above described operations to one or more devices that are configured to read the computer-executable instructions stored in the one or more storage media and execute them. In this case, the one or more devices perform the operations of the above-described devices, systems, and methods when executing the computer-executable instructions read from the one or more storage media. Also, an operating system on the one or more systems and/or devices may implement one or more of the operations of the above described devices, systems, and methods. Thus, the computer-executable instructions and/or the one or more storage media storing the computer-executable instructions thereon constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state device (including flash memory, DRAM, SRAM)) can be employed as a storage medium for the computer-executable instructions. The computer-executable instructions may be written to a computer-readable storage medium provided on a function-extension board inserted into a device or on a function-extension unit connected to a device, and a CPU provided on the function-extension board or unit may implement the operations of the above-described devices, systems, and methods.

This disclosure has provided a detailed description with respect to particular explanatory embodiments. The scope of the claims is not limited to the above-described embodiments, and various changes and modifications may be made without departing from the scope of the claims.

What is claimed is:

1. A method for providing a login context, the method comprising:

starting a virtual machine on a computing device, wherein the virtual machine includes an open services platform and an authentication service, wherein the authentication service includes a classloader, and an initial classloader is designated as the classloader of the authentication service at the starting of the virtual machine;

receiving a login-context request from a first application, wherein the login-context request identifies a login module;

determining a corresponding classloader of the login module, wherein the corresponding classloader is different than the initial classloader, wherein determining the corresponding classloader of the login module includes referencing a configuration table that includes entries that map login modules to respective classloaders;

designating the corresponding classloader as the classloader of the authentication service;

generating a login context of the login module using the corresponding classloader; and providing the login context of the login module to the first application.

2. The method of claim 1, wherein the open services platform is OSGi.

3. The method of claim 2, wherein the login module is a bundle.

4. The method of claim 1, wherein the authentication service is JAAS.

5. The method of claim 1, further comprising:

receiving a second login-context request from a second application, wherein the second login-context request identifies a second login module;

determining a second corresponding classloader of the second login module, wherein the second corresponding classloader is different than the initial classloader;

designating the second corresponding classloader as the classloader of the authentication service;
generating a login context of the second login module using the second corresponding classloader; and
providing the login context of the second login module to the second application.

6. The method of claim 1, further comprising redesignating the initial classloader as the classloader of the authentication service after generating the login context of the login module.

7. The method of claim 1, further comprising:
blocking other login-context requests; and
after generating the login context,
designating the initial classloader as the classloader of the authentication service, and then
unblocking the other login-context requests.

8. The method of claim 1, further comprising receiving a request to register a second login module; and
registering the second login module, which includes creating an entry in the configuration table for the second login module, wherein the configuration table associates the second login module with a second classloader of the second login module.

9. A computing device for creating a login context, the computing device comprising:
a computer-readable storage device; and
one or more processors configured to cause the computing device to perform operations including
operating a virtual machine that includes a security platform, wherein an initial classloader is designated as the classloader of the security platform when the virtual machine is started,
receiving a login-context request from a first application, wherein the login-context request identifies a first login module,
determining a corresponding first classloader of the first login module, wherein the corresponding first classloader is different than the initial classloader,
blocking generation of other login contexts before designating the corresponding first classloader of the first login module as the classloader of the security platform,
designating the corresponding first classloader of the first login module as the classloader of the security platform,
generating a login context of the first login module using the corresponding first classloader,
unblocking generation of other login contexts after generating the login context of the first application, and
providing the login context of the first login module to the first application.

10. The computing device of claim 9, wherein the operations further include
receiving a second login-context request from a second application, wherein the second login-context request identifies a second login module;
determining a corresponding second classloader of the second login module, wherein the corresponding second classloader is different than the initial classloader;
designating the corresponding second classloader as the classloader of the security platform;
generating a login context of the second login module using the corresponding second classloader; and
providing the login context of the second login module to the second application.

11. The computing device of claim 10, wherein the operations further include
registering the first login module, which includes associating the corresponding first classloader with the first login module; and
registering the second login module, which includes associating the corresponding second classloader with the second login module.

12. The computing device of claim 10, wherein the first login module implements a different security protocol than the second login module.

13. The computing device of claim 9, wherein the operations further include designating the initial classloader of the security platform as the classloader of the security platform after generating the login context.

14. The computing device of claim 9, wherein determining the corresponding first classloader of the first login module includes referencing a configuration table that includes entries that map login modules to respective classloaders.

15. The computing device of claim 9, wherein the operations further include:
receiving a request to register a second login module; and
registering the second login module, which includes creating an entry in a configuration table for the second login module, wherein the configuration table associates the second login module with a second classloader of the second login module.

16. One or more non-transitory computer-readable media storing instructions that, when executed by one or more computing devices, cause the one or more computing devices to perform operations comprising:
starting a virtual machine, wherein the virtual machine includes an authentication service, wherein the authentication service includes a classloader, and an initial classloader is designated as the classloader of the authentication service at the starting of the virtual machine;
receiving a login-context request from a first application, wherein the login-context request identifies a login module;
determining a corresponding classloader of the login module, wherein the corresponding classloader is different than the initial classloader;
designating the corresponding classloader as the classloader of the authentication service;
generating a login context of the login module using the corresponding classloader;
providing the login context of the login module to the first application;
receiving a request to register a second login module; and
registering the second login module, which includes creating an entry in a configuration table for the second login module, wherein the configuration table associates the second login module with a second classloader of the second login module.

17. The one or more non-transitory computer-readable media of claim 16, wherein the virtual machine operates an open services platform.

18. The one or more non-transitory computer-readable media of claim 16, wherein the operations further comprise designating the initial classloader as the classloader of the authentication service after generating the login context of the login module.

19. The one or more non-transitory computer-readable media of claim 16, wherein the operations further comprise:
blocking other login-context requests; and
after generating the login context,
designating the initial classloader as the classloader of the authentication service, and then
unblocking the other login-context requests.

20. The one or more non-transitory computer-readable media of claim 16, wherein determining the corresponding classloader of the login module includes referencing the configuration table, which includes entries that map login modules to respective classloaders.

* * * * *